2,927,118
L(+)-ISOGLUTAMINE COMPOUNDS AND PROCESS OF PREPARING SAME

Gaston Amiard, Noisy-le-Sec, and René Heymes, Romainville, France, assignors to UCLAF, Paris, France, a French body corporate No Drawing. Application June 16, 1958
Serial No. 742,047

Claims priority, application France June 19, 1957

17 Claims. (Cl. 260—389)

The present invention relates to L(+)-isoglutamine compounds and to a process of preparing the same.

L(+)-isoglutamine of Formula I is an amino acid having a carboxylic acid amide group in its molecule:

I 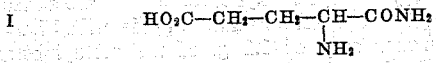

The existence of said amino acid in certain protein compounds has been confirmed by Kovacs et al. in "Experientia" vol. 11, page 96 (1955). L(+)-isoglutamine is useful as a buffering agent in the titrimetric determination of amino nitrogen in the studies on peptidases (see Melville et al. "Biochem. J." vol. 29, page 187 (1935)). The buffering effect of L(+)-glutamine is also utilized in the preparation of injectable solutions of aureomycine (see U.S. Patent No. 2,644,782 of July 7, 1953). Furthermore, said compound is used as addition to certain microbiological culture media in which it serves as growth promoting agent (see Silverman et al., "J. Bacteriol." vol. 68, page 93 (1954)).

Heretofore L(+)-isoglutamine has been synthetically prepared, for instance, by subjecting N-carbobenzyloxy glutamic acid anhydride to the action of ammonia. This process requires the use of the very dangerous phosgene for the preparation of chloro formic acid benzyl ester serving as carbobenzyl-oxylating agent. Said benzyl ester is an unstable compound difficult to purify. This reaction, moreover, yields a mixture of glutamine and isoglutamine which must be separated from each other.

According to another process, N-carbobenzyloxy glutamic acid anhydride is subjected to the action of alcohol to yield the corresponding diester mixed with the monoester. This reaction product is then reacted with hydrazine to yield a mixture of the corresponding mono- and di-hydrazide. After hydrogenolysis of the carbobenzyloxy group and reduction of the hydrazide group by means of Raney nickel, L-isoglutamine is obtained. In this process the dangerous phosgene and unstable chloro formic benzyl ester must also be used and the disadvantages inherent in their use are also encountered. Furthermore, the yields obtained thereby are rather poor because of the preferred formation of the dihydrazide of N-carbobenzyloxy glutamic acid.

According to another known process, the N-carbo-p-nitro benzyloxy group is used as blocking agent in place of the N-carbobenzyloxy group. Again dangerous phosgene is used and the disadvantages of this process are the same as those of the processes mentioned hereinabove.

According to another known process, N-phthaloyl glutamic acid anhydride is converted into the γ-monobenzyl ester of the corresponding dibasic acid. The carboxyl group in α-position is converted into the carboxylic acid chloride group and thereafter into the corresponding carboxylic acid amide group. The benzyl ester of said compound is split up by hydrogenation and the phthalimido group is saponified. This process involves seven different steps. It has the further disadvantage that it cannot be used for the preparation of optically active isoglutamine because racemization takes place during several reaction steps.

Another process of preparing isoglutamine consists in allowing ammonia to act on the mixed anhydride of acetic acid and the γ-monobenzyl ester of N-carbobenzyloxy-L-glutamic acid. This process has all the disadvantages of the above mentioned processes using the carbobenzyloxy group as blocking agent. Furthermore, the preparation of the γ-benzyl ester of N-carbobenzyloxy glutamic acid is rather difficult and is achieved only with poor yields.

Finally, L(+)-glutamine can be prepared by allowing ammonia to act on the acid chloride of N-tosyl pyrrolidone carboxylic acid, hydrolyzing the resulting compound to N-tosyl-L-isoglutamine, and splitting off the blocking agent by the action of sodium metal in liquid ammonia. The disadvantages of this process are especially encountered in its last reaction step which, when operating on a large scale, can be carried out with difficulty only. Furthermore, a mixture of L-isoglutamine and mineral salts is obtained the separation of which is also very difficult.

As stated hereinabove, L(+)-isoglutamine is used for many purposes. It is, therefore of considerable importance to provide the art with a process of making said compound which does not have the disadvantages of the known processes and which can be carried out in a simple and effective manner.

Therefore, it is one object of the present invention to provide such a simple and efficient process of preparing L(+)-isoglutamine and its N-trityl derivatives which process does not have the disadvantages of the known processes, and is characterized by the simplicity of its operations.

Another object of the present invention is to provide new and valuable derivatives of L-isoglutamine wherein the free amino group is substituted by a trityl group.

Other objects of the present invention and advantageous features thereof will become apparent as the description proceeds.

In principle, the process according to the present invention proceeds according to the following Formulas I to V:

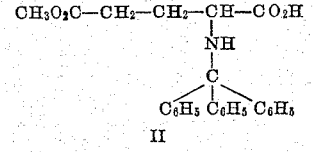

II

γ-methyl ester of N-trityl glutamic acid

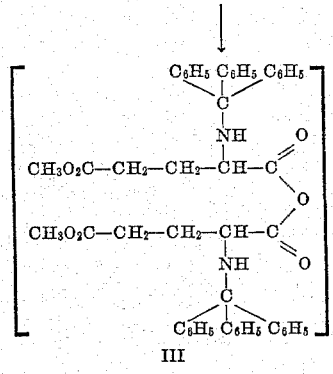

III anhydride of the γ-methyl ester of N-trityl glutamic acid

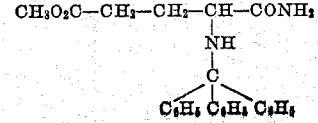

IV
γ-methyl ester of N-trityl-L-isoglutamine

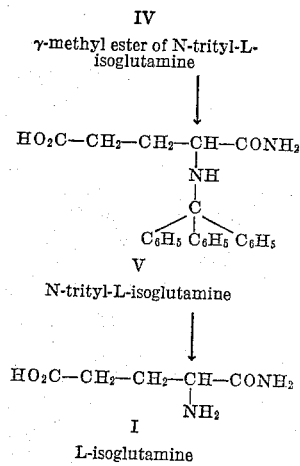

V
N-trityl-L-isoglutamine

HO₂C—CH₂—CH₂—CH—CONH₂
                |
               NH₂
I
L-isoglutamine

To produce L(+)-isoglutamine, the γ-methyl ester of N-trityl glutamic acid of Formula II, which may be obtained according to the process described in copending patent application Serial No. 594,117, filed on June 27, 1956, now Patent No. 2,883,399, issued April 21, 1959, is treated in solution with ammonia and dicyclohexyl carbodiimide. The mixture is acidified and filtered. The methyl ester of N-trityl-L-isoglutamine of Formula IV is isolated from the filtrate and is saponified and detritylated.

According to a preferred embodiment of the present invention, the γ-methyl ester of N-trityl glutamic acid of Formula II is dissolved in a solvent which is non-miscible with water, such as methylene chloride; said solution is treated with dicyclohexyl carbodiimide and ammonia, acidified by the addition of acetic acid, filtered, and evaporated to dryness. The residue consisting of the methylester of N-trityl-L-isoglutamine of Formula IV is taken up in a suitable solvent, such as ether. Said ester compound of Formula IV is then saponified by heating it in a suitable solvent, such as a lower alcohol, for instance, ethanol, in the presence of an alkali metal hydroxide, for instance, sodium hydroxide. The resulting N-trityl-L-isoglutamine of Formula V is isolated and detritylated by means of dilute acetic acid to yield L-isoglutamine of Formula I.

Furthermore, the γ-methyl ester of Formula II may be reacted with dicyclohexyl carbodiimide to yield the anhydride of the γ-methyl ester of N-trityl glutamic acid of Formula III which is then treated with ammonia to yield the methyl ester of N-trityl-L-isoglutamine of Formula IV.

The following examples serve to illustrate the present invention without, however, limiting the same thereto. More particularly, changes and variations in the nature of the solvents and the reaction components, the order of introducing the reactants into the reaction solution, the reaction temperature and duration, the manner of working up the reaction mixture and of isolating and purifying the reaction product may be made by those skilled in the art in accordance with the principles set forth herein and in the claims annexed hereto.

The melting points given in the examples are instantaneous melting points determined on the Maquenne block.

EXAMPLE 1

Preparation of the methyl ester of N-trityl-L-isoglutamic (Formula IV)

The methyl ester of N-trityl-L-glutamic acid (Formula II) is prepared according to the method described in copending application Serial No. 594,117, filed June 27, 1956, by reacting the hydrochloride of glutamic acid dibenzyl ester with trityl chloride followed by methanolysis of the resulting compound in the presence of sodium methylate, and hydrogenation in the presence of an alkaline agent. 8.1 g. of said ester are dissolved in 50 cc. of methylene chloride. After saturation of the solution with ammonia, 0.8 g. of N-trityl-L-glutamic acid methyl ester (Formula II) and 4.6 g. of dicyclohexyl carbodiimide are added. The reaction mixture is allowed to stand at room temperature for one hour. After filtration, a very slow stream of gaseous ammonia is bubbled through the solution for one minute. The mixture is allowed to stand at room temperature for 5 minutes, acidified by the addition of 1 cc. of acetic acid, and filtered. The filtrate is washed with 20 cc. of water, dried with sodium sulfate, and evaporated to dryness in a vacuum. The resulting residue is taken up in 50 cc. of ether. After filtration with suction 5.5 g. of the methyl ester of N-trityl-L-isoglutamine of Formula IV are obtained. The mother liquors are evaporated to dryness and the residue is again dissolved in 20 cc. of methylene chloride. The resulting solution is treated with gaseous ammonia. 1.8 g. of dicyclohexyl carbodiimide are added. After working up the reaction mixture as described hereinabove, a further crop of 1.2 g. of the methyl ester of N-trityl-L-isoglutamine is obtained. The total yield is 76% of the theoretical amount.

The compound, which has not yet been described, has a melting point of about 120° C. and a specific rotatory power of $[\alpha]_D^{20} = +28° \pm 1°$ (concentration: 1% in chloroform) and crystallizes in the form of small colorless plates which are insoluble in water, very slightly soluble in ether, and soluble in alcohol, acetone, and chloroform.

Analysis.—$C_{25}H_{26}O_3N_2$; molecular weight: 402.47. Calculated: 74.60% C; 6.51% H; 6.96% N. Found: 74.6% C; 6.6% H; 7.0% N.

EXAMPLE 2

Preparation of L(+)-isoglutamine (Formula I)

(a) SAPONIFICATION OF THE METHYL ESTER OF N-TRITYL L-ISOGLUTAMINE (FORMULA IV)

2.01 g. of the methyl ester of N-trityl-L-isoglutamine (Formula IV) prepared according to the preceding example, are dissolved in 10 cc. of 95% ethanol while heating the mixture of 45° C. on a water bath. 5.2 cc. of an N sodium hydroxide solution are slowly added thereto. After heating on a water bath for 10 minutes, part of the alcohol is distilled off in a vacuum. 20 cc. of water are added and the remainder of the alcohol present in the reaction mixture is distilled off in a vacuum while heating to 40° C. The resulting aqueous solution is acidified by the addition of 5.5 cc. of N hydrochloric acid and 10 cc. of methylene chloride are admixed thereto. The organic layer is then decanted, dried over sodium sulfate, and evaporated to dryness in a vacuum. The residue is taken up in 20 cc. of petroleum ether. The solution is filtered and dried. 1.92 g. of N-trityl-L-isoglutamine of Formula V are obtained. The yield corresponds to the theoretical yield. The compound has a specific rotatory power of $[\alpha]_D^{20} = +35° \pm 1°$ (concentration: 2% in absolute alcohol) and is used without further purification in the following reaction step.

(b) DETRITYLATION OF N-TRITYL-L-ISOGLUTAMINE (FORMULA V)

0.5 g. of N-trityl-L-isoglutamine of Formula V are added to a mixture of 1 cc. of acetic acid and 1 cc. of water. The mixture is allowed to stand at 28° C. for 25 minutes. 2 cc. of water are added. After filtration, the solution is concentrated at 40° C. in a vacuum. The residue is dissolved in acetone. After filtration, the solution is evaporated to dryness and yields 150 mg. (80% of the theoretical amount) of L(+)isoglutamine of Formula I. Said compound has a specific rotatory power of $[\alpha]_D^{20} = +20° \pm 1°$ (concentration: 1% in water).

Analysis:—$C_5H_{10}O_3N_2$; molecular weight: 146.15. Calculated: 41.09% C; 6.90% H; 19.17% N. Found: 41.0% C; 6.9% H 19.1% N.

This product is identical with an authentic sample of L(+)-isoglutamine.

EXAMPLE 3

*Isolation of the α-anhydride of the γ-methyl ester of N-trityl-L-glutamic acid (Formula III)*

8 g. of the γ-methyl ester of N-trityl-L-glutamic acid of Formula II are dissolved in 50 cc. of methylene chloride. The equivalent amount of dicyclohexyl carbodiimide is added to the solution and the mixture is allowed to stand at a temperature of −10° C. for one hour. After filtration, the resulting solution is evaporated to dryness in a vacuum. The residue is taken up in as little as possible of methylene chloride. 80 cc. of methanol are added. The methylene chloride is distilled off. The remaining mixture is filtered, thereby yielding the α-anhydride of the γ-methyl ester of N-trityl-L-glutamic acid of Formula III. The yield is 90% of the theoretical amount. The compound has a melting point of 157° C. and a specific rotatory power of $$[\alpha]_D^{20} = +52° \pm 1°$$

(concentration: 1% in chloroform). This compound which has not yet been described crystallizes in the form of small colorless prisms which are insoluble in water and ether, very slightly soluble in alcohol and soluble in chloroform.

*Analysis:*—$C_{50}H_{48}O_7N_2$; molecular weight: 788.9. Calculated: 76.12% C; 6.13% H; 3.55% N. Found: 76.1% C; 6.1% H; 3.6% N.

The α-anhydride of the γ-methyl ester of N-trityl-L-glutamic acid of Formula III can readily be converted into the γ-methyl ester of N-trityl-L-isoglutamine of Formula IV by treating it with ammonia and working up the reaction mixture as described in Example 1.

We claim:

1. The methyl ester of N-trityl-L-isoglutamine.
2. N-trityl-L-isoglutamine.
3. The α-anhydride of the γ-methyl ester of N-trityl-L-glutamic acid.
4. The N-trityl-L-isoglutamic acid compound of the formula

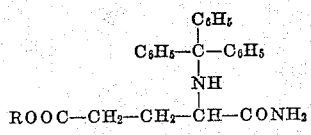

wherein R is a lower alkyl radical.

5. The process of producing L(+)-isoglutamine of the formula

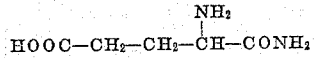

consisting in reacting a solution of the γ-methyl ester of N-trityl-L-glutamic acid with dicyclohexyl carbodiimide and ammonia, acidifying and filtering the reaction mixture, isolating the methyl ester of N-trityl-L-isoglutamine, saponifying said methyl ester and splitting off the trityl group from the resulting N-trityl-L-isoglutamine to yield L(+)-isoglutamine.

6. The process according to claim 5, wherein the γ-methyl ester of N-trityl-L-glutamic acid is dissolved in a solvent immiscible with water.

7. The process according to claim 6, wherein the solvent immiscible with water is methylene chloride.

8. The process according to claim 5, wherein acidification is effected by the addition of acetic acid.

9. The process according to claim 5, wherein the methyl ester of N-trityl-L-isoglutamine is isolated by evaporating the solvent and taking up the residue in ether.

10. The process according to claim 5, wherein the methyl ester of N-trityl-L-isoglutamine is saponified by heating in a lower alkanol in the presence of an alkali metal hydroxide.

11. The process according to claim 10, wherein the lower alkanol is ethyl alcohol and the alkali metal hydroxide is sodium hydroxide.

12. The process according to claim 5, wherein the trityl group is split off by treating the N-trityl-L-isoglutamine with dilute acetic acid.

13. The process according to claim 5, wherein a solution of the γ-methyl ester of N-trityl-L-glutamic acid is reacted with dicyclohexyl carbodiimide, the resulting α-anhydride of said ester acid is isolated, treated with ammonia, and the resulting methyl ester of N-trityl-L-isoglutamine is isolated.

14. The process of producing L(+)-isoglutamine of the formula

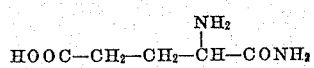

consisting in dissolving the γ-methyl ester of N-trityl-L-glutamic acid in a solvent immiscible with water, reacting the resulting solution with dicyclohexyl carbodiimide and ammonia, acidifying the reaction mixture by the addition of acetic acid, filtering the acidified reaction mixture, evaporating the filtrate to dryness, taking up the residue in ether, filtering off the resulting methyl ester of N-trityl-L-isoglutamine, heating said ester in a lower alkanol in the presence of an alkali metal hydroxide, and reacting the resulting N-trityl-L-isoglutamine with dilute acetic acid to split off the trityl group.

15. The process according to claim 14, wherein the solvent immiscible with water is methylene chloride.

16. The process according to claim 14, wherein the lower alkanol is ethanol and the alkali metal hydroxide is sodium hydroxide.

17. The process of producing L(+)-isoglutamine of the formula

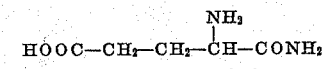

consisting in dissolving the γ-methyl ester of N-trityl-L-glutamic acid in a solvent immiscible with water, adding to the resulting solution dicyclohexyl carbodiimide at temperature of about −10° C., allowing the reaction mixture to stand at said temperature until the reaction is completed, filtering the reaction mixture, evaporating to dryness the filtrate, dissolving the residue in a solvent immiscible with water, adding methanol to the resulting solution, distilling off the solvent immiscible with water, filtering off the α-anhydride of the γ-methyl ester of N-trityl-L-glutamic acid, dissolving said anhydride in a solvent immiscible with water, passing gaseous ammonia through the solution, acidifying the reaction mixture by the addition of acetic acid, filtering the acidified reaction mixture, evaporating the filtrate to dryness, taking up the residue in ether, filtering off the resulting methyl ester of N-trityl-L-isoglutamine, heating said ester in a lower alkanol in the presence of an alkali metal hydroxide, and reacting the resulting N-trityl-L-isoglutamine with dilute acetic acid to split off the trityl group.

No references cited.